United States Patent [19]
Tsukuda et al.

[11] 4,259,101
[45] Mar. 31, 1981

[54] METHOD FOR PRODUCING OPTICAL FIBER PREFORM

[75] Inventors: Yasuo Tsukuda, Ome; Katsuyuki Imoto, Sayama; Kenzo Susa, Tokyo; Iwao Matsuyama, Sagamihara; Tsuneo Suganuma, Tokorozawa, all of Japan

[73] Assignee: Hitachi, Ltd., Tokyo, Japan

[21] Appl. No.: 17,025

[22] Filed: Mar. 2, 1979

[30] Foreign Application Priority Data

Mar. 3, 1978 [JP] Japan .................................. 53-23486

[51] Int. Cl.³ ........................ C03C 25/02; C03B 37/02
[52] U.S. Cl. .......................................... 65/18; 65/3 A; 65/13; 65/144; 65/157; 264/65; 264/81; 427/163
[58] Field of Search ...................... 65/3 A, 18, 32, 144, 65/157, 25 R; 264/64, 65, 81, 85; 427/163, 167

[56] References Cited
U.S. PATENT DOCUMENTS

| 3,933,454 | 1/1976 | DeLuca | 65/18 X |
| 3,957,474 | 5/1976 | Kobayashi et al. | 65/3 A |
| 4,062,665 | 12/1977 | Izawa et al. | 65/3 A |
| 4,125,389 | 11/1978 | King | 65/3 A |
| 4,135,901 | 1/1979 | Fujiwara et al. | 65/3 A X |

*Primary Examiner*—Robert L. Lindsay, Jr.
*Attorney, Agent, or Firm*—Craig and Antonelli

[57] ABSTRACT

A method for producing an optical fiber preform comprising the steps of blowing, through at least one nozzle, gaseous material producing glass material soot by a CVD reaction to permit the glass material soot to be deposited on a target to produce a soot rod which grows in size, and heating and rendering transparent the soot rod produced in the first step, wherein a pipe is arranged substantially concentrically with the glass material soot so as to permit gas to flow through a clearance between the deposited glass material soot and the inner wall surface of the pipe in a direction in which the soot rod grows in size. The method makes it possible to prevent the outer peripheral portion of the soot rod from becoming porous and to satisfactorily control the diameter of the soot rod.

10 Claims, 7 Drawing Figures

METHOD FOR PRODUCING OPTICAL FIBER PREFORM

BACKGROUND OF THE INVENTION

1. Field of the Invention

This invention relates to methods for producing optical fiber preform used as starting material for producing, by wire drawing, fiber-optic bundles for forming optical transmission lines, and more particularly to a method for producing an optical fiber preform consisting in causing glass material soot (hereinafter referred to as soot) formed by a CVD (Chemical Vapour Deposition) method to be deposited on the target to form a soot rod, and heating the soot rod to render same transparent.

2. Description of the Prior Art

An outside vapor oxidation deposition method and an axial deposition method are known as methods for producing optical fiber preform by causing soot to be deposited on the target to form a soot rod (a rod-shaped compact body of pulverized glass) and heating the soot rod to render same transparent.

The outside vapor oxidation deposition method will first be described by referring to FIG. 1. An oxyhydrogen flame 3 containing source gas which forms glass upon reaction is blown through a burner 4 against a rotating seed glass bar 2, the burner 4 being movable. The soot in the flame 3 is deposited on the rotating seed glass bar 2 to form a soot rod 1. The soot rod 1 is rendered transparent by subjecting same to calcination and then heating same at elevated temperature after withdrawing the seed glass bar 2. 5 designates a burner movement guide.

The axial deposition method will be described by referring to FIGS. 2 and 3. In the method shown in FIG. 2 which is described in Japanese Pat. application Laid-open No. 107313/76, soot is deposited on a rotating target 15 axially thereof. More specifically, soot is directed axially of the target 15 as a flame 12 is blown from a burner 11, so that the soot will be deposited on the target 15 which moves downwardly while rotating. The target 15 is enclosed in a glass tube 14 which is in intimate contact with a soot rod 13 formed on the target 15 by the deposited soot, so as to control the diameter of the soot rod 13. After the glass tube 14 is filled with the soot rod, the rod is heated to render the soot rod transparent and unitary with the glass tube 14, so as to produce an optical fiber preform.

FIG. 3 shows a method wherein a flame 25 is blown from a burner 26 axially of a target 21 which moves axially while rotating so as to cause soot to be formed in the flame 25 and deposited axially on the target 21 to form a soot rod 24, and the soot rod 24 is continuously heated in a furnace 23 and rendered transparent, so as to produce an optical fiber preform 22. The method shown in FIG. 3 is similar to the method shown in FIG. 2 in that the soot is deposited axially of the target which moves axially while rotating, but the former is distinct essentially from the latter in that the soot rod alone constitutes the optical fiber preform instead of the glass tube and the soot rod together constituting the optical fiber preform and that the soot rod is rendered transparent by continuously heating it following its production.

Some disadvantages are associated with the methods of the prior art described hereinabove. These disadvantages are as follows.

The outside vapor oxidation deposition method shown in FIG. 1 requires an additional step of withdrawing the seed glass bar, thereby making it impossible to render the soot rod transparent in a continuous operation of forming a soot rod and giving transparency to the soot rod.

In the axial deposition method shown in FIG. 2, a difficulty is encountered in many operations in causing soot deposition to be effected in such a manner that a soot rod is formed that has a diameter which is equal to the inner diameter of the glass tube. Meanwhile the axial deposition method shown in FIG. 3 has the following disadvantages:

(1) Difficulties are experienced in causing dense soot deposition to take place in the outer marginal portion of a soot rod, and consequently the outer marginal portion of the soot rod gets porous, with a result that the soot rod has a large diameter than would be the case if dense soot deposition could be effected in the outer marginal portion of the soot rod.

(2) The distribution of refractory index of an optical fiber preform obtained by heating and rendering transparent a soot rod intended for producing fiber-optic bundles which show a graded index type refractory index is, as indicated by a curve 31 in FIG. 4, deflected at the outer marginal portion of the soot rod from the parabolic profile indicated by a curve 32 which is usually desired.

(3) Control of the diameter of the soot rod formed is not effected satisfactorily.

In this connection, it is added that the aforesaid deflection of the distribution of the refractive index of the optical fiber preform from the parabolic profile in the marginal portion of the soot rod as shown in FIG. 4 could be obviated if the diameter of the soot rod could be reduced without altering the rate of axial movement of the target and the condition of the burner.

Japanese Pat. application Laid-open Nos. 71316/76, 107313/76 and 143037/77 are cited as the prior art having the greatest relevance to the present invention.

SUMMARY OF THE INVENTION

This invention has as its object the provision of a method for producing an optical fiber preform which obviates the aforementioned disadvantages of the prior art.

According to the invention, there is provided a method for producing an optical fiber preform comprising the steps of blowing, through at least one nozzle, gaseous material which forms glass upon reaction to produce glass material soot by a CVD method which soot is deposited on a target to allow a soot rod to be formed thereon, and heating and rendering transparent the soot rod formed in the first step, wherein the improvement comprises a pipe arranged substantially concentrically with the deposited glass material soot so as to permit gas to flow through a clearance between the outer surface of the deposited glass material soot and the inner wall surface of the pipe in a direction in which the soot rod grows in size.

DESCRIPTION OF THE PRESENTLY PREFERRED EMBODIMENTS

The preferred embodiments of the invention will now be described by referring to various examples for producing an optical fiber preform by the method according to the invention.

EXAMPLE 1

Figure 5:
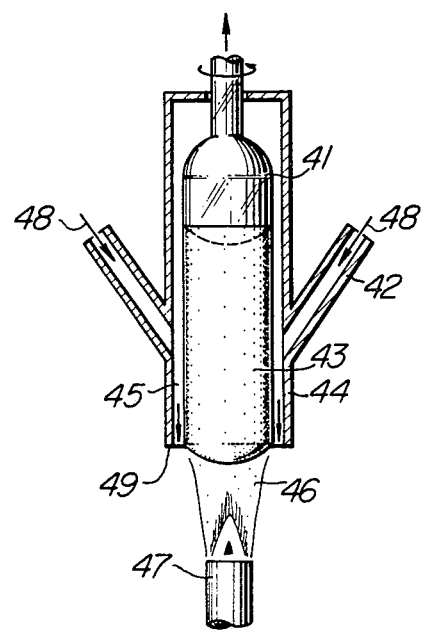
FIG. 5 is a schematic sectional view of a device used in carrying into practice the method for producing an optical fiber preform comprising one embodiment of the invention.

FIG. 5 shows a device suitable for carrying into practice one embodiment of the invention. As shown, $SiCl_4$ and $POCl_3$ are fed to an oxyhydrogen burner 47 by using, as carrier gas, oxygen gas of the flow rate of 120 ml/min. Located above the burner 47 is a target 41 of the columnar shape, formed of quartz, on which soot formed in a flame 46 is deposited. The target 41 is moved upwardly while rotating at 30 r.p.m. In this case, the target 41 may be fixed while the burner 47 is rotated. In order to control the outer diameter of a soot rod 43 which is growing in size, a pipe 44 formed of quartz and having six gas inlet branch pipes 42 on its outer circumferential surface is arranged around the target 41 in enclosing relation, and argon gas is supplied at the flow rate of 10 l/min in the direction of an arrow 48. The argon gas flows through a clearance 45 and along the outer circumferential surface of the soot rod 43 while blowing away excess soot which might otherwise be deposited on the soot rod 43. The aforesaid flow rate of the argon gas has been obtained as a result of experiments as a suitable value for imparting an outer diameter of 35 mm to the soot rod 43. The clearance 45 was 4 mm, and the target 41 was moved upwardly at a rate of 20 to 40 mm/hr. The inlet branch pipes 42 had an inner diameter of about 10 mm. The pipe 44 has a forward end 49 which was disposed about 10 mm higher than the forward end of the soot rod 43.

Figure 1:
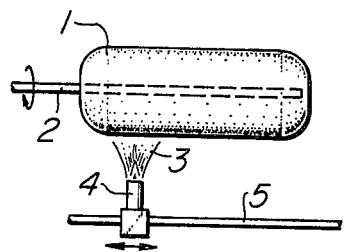
FIG. 1 is a sectional view showing a soot rod produced by the outside vapor oxidation deposition method.
Figure 2:
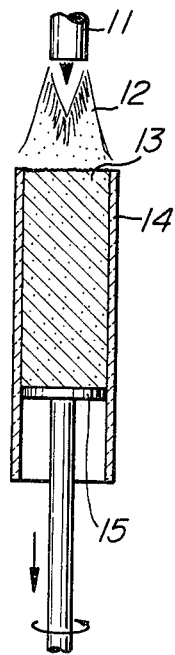
FIG. 2 is a sectional view in explanation of the production of a soot rod by one example of the axial deposition method.
Figure 3:
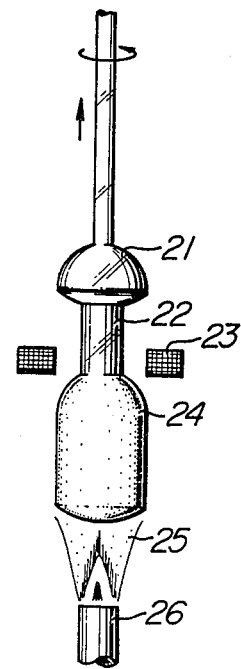
FIG. 3 is a sectional view in explanation of the production of an optical fiber preform by another example of the axial deposition method.

The soot rod produced in this example was formed of $SiO_2$-$P_2O_5$ glass and had an outer diameter of 35 mm and a length of 300 mm. The soot rod had a variation of less than ±1% in its outer diameter, and the deposited soot in its outer marginal portion was dense. It is added that the soot rod 24 produced by the prior art shown in FIG. 3 generally has a variation of about ±3% in its outer diameter.

The soot rod produced was then heated in an electric furnace to 1500° to 1600° C., so as to render transparent the soot rod. What resulted was an optical fiber preform of high quality.

EXAMPLE 2

The condition of production in this example was similar to that described with reference to Example 1, except that the source gas used in this example consisted of $SiCl_4$ and $GeCl_4$. The soot rod produced in this example was formed of $SiO_2$-$GeO_2$ glass and had an outer diameter of 35 mm and a length of 300 mm. The soot rod had a variation of less than ±1% in its outer diameter, and the deposited soot in its outer marginal portion was dense.

The soot rod was rendered transparent in the same manner as described with reference to Example 1, thereby producing an optical fiber preform of high quality.

Example 3

Figure 6:
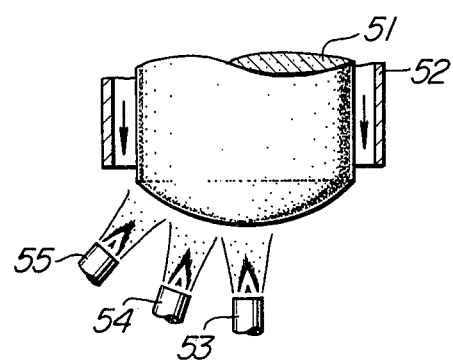
FIG. 6 is a sectional view of the burners arranged in positions for producing an optical fiber preform of the granded index type refractive index.

Soot rods were produced in this example under the same condition as described with reference to Example 2, except that three burners were used for burning therein source gases slightly differing from one another in the concentration of $GeCl_4$. FIG. 6 shows in section the vicinity of the burners of the device used for producing a soot rod in this example. Other parts of the device are similar to those of the device shown in FIG. 5, except that the electric furnace for heating and rendering transparent the soot rod is located in the upper portion of the device.

The source gases supplied to the burners 53, 54 had compositions such that the concentration of $GeCl_4$ was slightly lower in going radially outwardly of the target 61, so that the concentration of $GeO_2$ would be highest in the center of the soot rod 51 and would drop in parabolic profile in going radially outwardly from the center. More specifically, the source gas supplied to the burner 53 had the highest concentration of $GeCl_4$, the source gas supplied to the burner 54 had an intermediate concentration of $GeCl_4$ and the source gas supplied to the burner 55 had the lowest concentration of $GeCl_4$. The numeral 52 designates a pipe arranged in enclosing relation with the portion on which the soot is being deposited.

Figure 7:
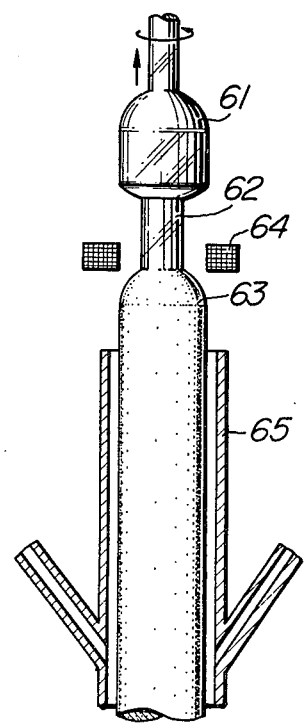
FIG. 7 is a sectional view in explanation of the step of heating and rendering transparent a soot rod of the method for producing an optical fiber preform comprising another embodiment of the invention.

The soot rod produced was continuously heated and rendered transparent by the electric furnace located in the upper portion of the device or above the pipe. FIG. 7 shows in schematic section the vicinity of the electric furnace used in this example. The soot rod 63 produced and moved upwardly in the previous step was continuously heated and rendered transparent by the electric furnace 64, located above the pipe 65, the soot rod 63 being heated to the range between 1500° and 1600° C. The heated soot rod underwent contraction to provide an optical fiber preform 62.

Figure 4:
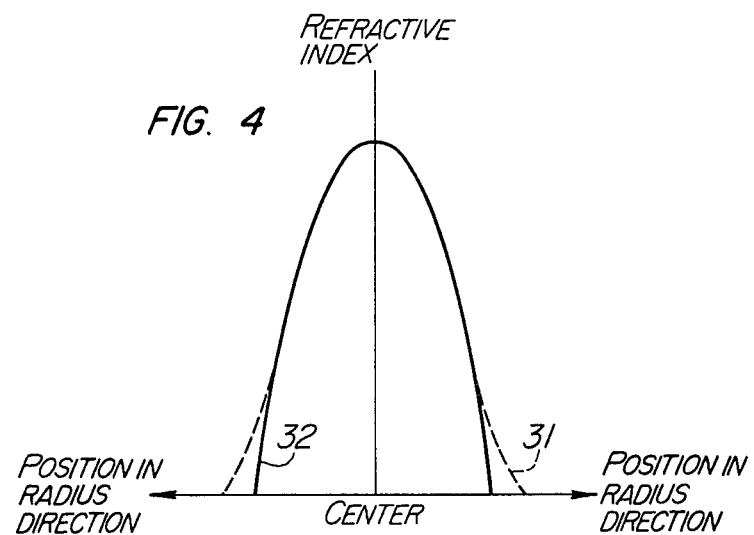
FIG. 4 is a graph showing the refraction index of an optical fiber preform.

The optical fiber preform produced in this example was columnar in shape and has a diameter of 16.5 mm. The diameter of the optical fiber preform had a variation of less than ±1%. The distribution of the refractive index of the preform, which corresponded to the curve 32 shown in FIG. 4, substantially coincided with the parabolic profile.

In producing the glass material soot, flame hydrolysis, thermal decomposition or a chemical reaction using plasma may be used. These techniques are well known in the field of the art of producing fiber-optic bundles and generally referred to as a CVD method collectively. The kind of source gas, its flow rate and the process of introducing the source gas are also known for carrying out the CVD method in the field of the art of producing fiber-optic bundles.

In producing a target, any material may be used so long as the material is heat resistant, closely similar in coefficient of thermal expansion to the glass to be produced and highly wettable with respect to the glass to be produced. Heat resisting glass, quartz glass and the like are generally used. The target is preferably substantially circular in cross section which is perpendicular to the axis thereof, but a target having a polygonal cross sectional shape, for example, may be used. The forward end of the target may be planar but is preferably convex and coarsegrained to facilitate deposition of soot thereon. The diameter of the target is substantially equal to that of the optical fiber preform to be produced.

The target is moved, while rotating, in a direction opposite to the direction in which a soot rod grows in size. Generally, the rate of revolution is between 15 and 200 r.p.m., preferably between 30 and 120 r.p.m. If the r.p.m. is too small, variations are produced in shape and quality from one soot rod to another; if it is too large, the target tends to vibrate or the soot deposited on the target tends to be scattered by centrifugal forces. Thus the rate of revolution is preferably in the aforesaid range. The rate of movement of the soot rod in the axial direction should be equal to the rate of growth thereof in size, although the direction of movement of the target is opposite to the direction of growth of the soot rod.

As a heat source for producing soot, any one of the well-known techniques including an oxyhydrogen burner, electric furnace, plasma, etc., may be used.

The pipe arranged around a portion on which soot is being deposited should be formed of material, such as glass, metal, etc., which can withstand heat generated at 300° to 400° C. In actual practice, the use of glass is advantageous from the point of view of avoiding corrosion, in view of the fact that the source gas contains chlorides in many cases.

The portion on which the soot is being deposited is the forward end of the target when production of a soot rod is started, but shifts to the forward end of the soot rod as soot deposition progresses. In apparatus tolerating ordinary machining finishes, the outer circumferential surface of this portion and the inner wall surface of the pipe generally define therebetween a clearance of over 1 mm. However, the size of the clearance can be reduced without causing any trouble, so long as the soot rod is not brought into contact with the pipe during operation. In case the clearance is less than 1 mm, the soot rod may be brought into contact with the pipe due to vibration or other factor, depending on the degree of precision with which the apparatus is finished, thereby making it impossible to produce products of desired quality. No limits are placed on the size of the clearance which is greater than the aforesaid value. However, an increase in the size of the clearance results in an increase in the flow rate of gas through the clearance so that it is not desirable from the economical view point to increase the size of the clearance more than is necessary.

The forward end of the pipe is most preferably set at a level within the range of from a first level coinciding with the lowest point of the curved end surface of the soot rod to a second level coinciding with a level where the curved surface finishes.

The forward end of the pipe may be set, with regard to the desired soot deposition, at a level within a range of from said first level to a third level coinciding with a level where the imaginary extension of the said curved end surface intersects the edge of the retracted pipe. Alternatively, the above range may not be limited and it may be extended by a distance which corresponds to a quarter of radius of the soot rod either upwards or downwards from the said preferable range limits.

Generally, inert gas (including nitrogen gas) or oxygen gas is caused to flow around the portion on which the soot is deposited. However, any other gas may be used so long as no pernicious effects are exerted on the surface of the soot rod. It is necessary that the flow rate of gas is higher than the rate at which the direction of flow of source gas or the soot formed in the flame can be varied. For practical purposes, the flow rate of gas is determined by conducting experiments. More specifically, other conditions than the flow rate of gas are kept unaltered, and the flow rate of gas is varied to measure the clearance between the soot rod and the pipe enclosing the soot rod which is growing in size. This test is conducted to find out the flow rate of gas which brings the size of the clearance to a predetermined level. This flow rate of gas is used as a predetermined flow rate of gas. Any process may be adopted for introducing the gas into the clearance, so long as the gas introduced thereinto flows at the aforesaid predetermined flow rate along a compact body of deposited soot substantially in the direction in which the soot is deposited. For example, the gas may be caused to flow by using a device shown in FIG. 5 in which a pipe 44 is formed on its outer circumference with gas inlet branch pipes 42 inclined in the direction of movement of a target 41 to allow the gas to flow along the body of deposited soot in the predetermined direction, when the gas is introduced into the clearance between the outer circumference of the body of deposited soot and the inner wall surface of the pipe 41 through the branch pipes 42. The branch pipes 42 may be formed of the same material as the pipe 41. The larger the number of the branch pipes 42, the more uniform the current of gas can be made. However, the gas can be introduced through only one branch pipe 42 instead of the plurality of branch pipes 42, without adversely affecting the quality of the product. The device for introducing the gas will also be described in the description of the embodiments. It is to be understood that the gas can be introduced through the end of the pipe which is opposite to the end thereof near to the burner.

The step of heating and rendering transparent the soot rod in the method according to the invention is known in the field of the art of producing fiber-optic bundles. Although the heating temperature varies depending on the type of glass, the heating temperature is in the range between 1500° and 1600° C. when the glass is quartz glass of the ordinary type. An electric furnace is used as a heat source in many applications, but the invention is not limited to this specific heat source. The step of heating and rendering transparent a soot rod may be conduced separately from the step of producing the soot rod. However, if the device shown in FIG. 7 is used, it is possible to perform the step of producing a soot rod and the step of heating and rendering transparent the soot rod in one operation, without removing the soot rod from the target.

When it is desired to impart a uniform refractive index to an optical fiber preform, source gas of the same composition has only to be blown through one or a plurality of nozzles as shown in FIG. 5. However, when it is desired to produce an optical fiber preform which is of the graded index type in the radial distribution of the refractive index, source gases of different compositions capable of producing glass of different refractive indices radially of the preform should be blown through a plurality of nozzles corresponding in number to the source gases of different compositions. The plurality of nozzles are arranged, as shown in FIG. 6, in positions which correspond to the desired refractive indices to be obtained in the optical fiber preform. In FIG. 6, the reference numerals 53, 54 and 55 designate oxyhydrogen burners having nozzles for blowing source gases.

In the method for producing an optical fiber preform according to the invention which can be carried into practice by using the devices of the aforesaid construction, the excess soot tending to be deposited on the outer circumferential surface of the forward end of a soot rod is blown away by the gas flowing through the clearance between the pipe and the deposited soot, thereby making it possible to effect dense deposition of soot in the outer marginal portion of the soot rod by preventing the rod from becoming porous. Thus, the invention enables control of the diameter of the soot rod to be effected satisfactorily, and permits an optical fiber preform of the refractive index substantially coinciding with the parabolic profile to be produced when the optical fiber preform of the graded index type refractive index is to be produced. An additional advantage is that the method dispenses with the step of withdrawing the seed glass bar, thereby making it possible to perform the step of producing a soot rod and the step of heating and rendering transparent the soot rod in one operation. Thus the invention permits an optical fiber preform offering the aforesaid advantages to be produced readily.

From the foregoing, it will be appreciated that the method according to the invention for producing an optical fiber preform is characterized by the feature of causing a gas stream to flow around the outer circumferential surface of a compact body of soot being deposited on the target by the CVD method or a soot rod to be formed by such soot. By virtue of this feature, the invention makes is possible to readily produce an optical fiber preform of low variation in diameter and good distribution of the refractive index. When required, the production of such optical fiber preform can be carried out in one operation.

What is claimed is:

1. A method for producing an optical fiber preform comprising the steps of:
   blowing through at least one nozzle gaseous material which forms glass upon reaction to produce glass material soot by a CVD method which soot is deposited on a movable target to allow a soot rod to be formed thereon; and
   heating and rendering transparent said soot rod produced in the first step; wherein the improvement comprises:
   arranging a pipe substantially concentrically with the glass material soot so as to permit gas to flow through a clearance between the deposited glass material soot and the inner wall surface of the pipe in a direction in which the soot rod grows in size.

2. A method for producing an optical fiber preform as set forth in claim 1, wherein said gas permitted to flow through said clearance is inert gas.

3. A method for producing an optical fiber preform as set forth in claim 1, wherein said gas permitted to flow through said clearance is oxygen gas.

4. A method for producing an optical fiber preform as set forth in claim 1, wherein said pipe is formed of glass material.

5. A method for producing an optical fiber preform as set forth in claim 1, wherein said target is moved axially thereof in a direction which is opposite to the direction in which said soot rod grows in size, while said target rotates.

6. A method for producing an optical fiber preform as set forth in claim 1, wherein said clearance is over 1 mm.

7. A method for producing an optical fiber preform as set forth in any one of claims 1 to 6, wherein said pipe is formed on its outer circumference with at least one gas inlet branch pipe, said gas inlet branch pipe being inclined in the direction in which said target moves.

8. A method for producing an optical fiber preform as set forth in any one of claims 1 to 6, wherein said step of producing a soot rod and said step of heating and rendering transparent said soot rod are performed continuously in one operation.

9. A method for producing an optical fiber preform as set forth in any one of claims 1 to 6, wherein said nozzle is plural in number, and said gaseous material forming glass upon reaction is blown in different compositions through said plurality of nozzles each corresponding to one of said different compositions.

10. In a method for producing an optical fiber preform comprising the steps of:
   producing a glass material soot rod on a movable target by chemical vapor deposition; and
   heating said soot rod rendering said rod transparent; wherein the improvement comprises:
   establishing a gas flow between the soot rod and a pipe arranged substantially concentrically with said soot rod in a direction in which the soot rod grows in size, said movable target being rotated and moved in a direction opposite said gas flow.

* * * * *